United States Patent [19]

Hartness

[11] Patent Number: 4,775,978
[45] Date of Patent: Oct. 4, 1988

[54] DATA ERROR CORRECTION SYSTEM

[75] Inventor: Carl B. Hartness, Bloomington, Minn.

[73] Assignee: Magnetic Peripherals Inc., Bloomington, Minn.

[21] Appl. No.: 3,961

[22] Filed: Jan. 12, 1987

[51] Int. Cl.⁴ .............................................. G06F 11/10
[52] U.S. Cl. ..................................................... 371/38
[58] Field of Search ............... 371/38, 39, 40; 360/47, 360/53

[56] References Cited

U.S. PATENT DOCUMENTS

| | | | |
|---|---|---|---|
| 4,016,547 | 4/1977 | Page | 364/200 |
| 4,202,018 | 5/1980 | Stockham | 360/47 |
| 4,336,612 | 6/1982 | Inoue et al. | 371/39 |
| 4,423,448 | 12/1983 | Frandsen | 360/106 |
| 4,562,577 | 12/1985 | Glover et al. | 371/38 |
| 4,698,810 | 10/1987 | Fukuda et al. | 371/38 |
| 4,706,250 | 11/1987 | Patel | 371/39 |

Primary Examiner—Charles E. Atkinson
Attorney, Agent, or Firm—E. L. Schwarz; J. A. Genovese

[57] ABSTRACT

A data storage system has a plurality of individual data storage units, each of which can undergo unpredictable independent failure. By dividing data blocks to be stored therein into a number of sub-blocks one or more less than the number of data storage units and creating a redundant data sub-block of the type permitting reconstruction of any one sub-block of data using the remaining sub-blocks and the redundant sub-blocks, and then storing each of the data sub-blocks and the redundant sub-block on a different one of the data storage units, it is possible to reconstruct any one failed data sub-block of a related group using the other sub-blocks. It is necessary to be able to detect the failure of the sub-block, and the preferred way is by a multibit error detection code appended to each sub-block, or by failure sensed within and by an individual data storage unit. The system is preferably implemented with disk drives functioning as the data storage units in view of the well-known tendency of such devices to occasionally generate an error which prevents reading a previously written record on one of them.

6 Claims, 2 Drawing Sheets

DATA ERROR CORRECTION SYSTEM

BACKGROUND/INFORMATION DISCLOSURE

The device of choice today for non-volatile mass storage of data is the magnetic disk storage system. The type of magnetic disk storage system of particular interest here is the so-called hard disk drive having, not surprisingly, one or more rigid disks turning at a relatively high speed. Each disk surface has suspended aerodynamically a few microinches therefrom its own transducer device for reading and writing data on the disk. In the larger data processing installations, there may be several drives all providing data storage for a single central computer. For some time, the reading or writing of several disk surfaces simultaneously has been contemplated in an effort to improve data rates between individual disk storage units and the central computer. With the recent advent of large semiconductor memories, the difficult problem of synchronization of data transmission between the drives and the central computer has been solved by the expedient of simply using such semiconductor memories as a buffer to compensate for differences in angular position of the disk.

While disk drive reliability has improved substantially over the last few years, the devices are nonetheless electromechanical and as such liable to occasional failures. These failures may be caused by a circuit defect which affects the readback function, in which case no data has been lost. It is only necessary to repair the defective circuitry to gain access to the data. If the failure comes at an inconvenient time, however, the delays may cause great expense for the users. If the failure occurred in the writing circuitry or on the medium itself, then the data has been permanently lost. If the failure is a so-called head crash where the heads strike and destroy the disk surfaces, then that data is permanently lost too. These cases usually are characterized by the fact that only a single drive or drive controller is involved.

In many cases, the data stored on the disk drives in an installation is much more valuable than the drives themselves. This may arise in the situation where the data represents a major investment in computer or human time. Sometimes the data has time-related value, say in a real-time environment or when printing time-sensitive materials such as paychecks or management reports. Therefore, one must usually design such storage systems for high reliability since the cost of losing data due to a drive failure is often unacceptably high. Accordingly there is substantial motivation for avoiding such loss or delay of access to the data.

The well-known prior art solution to some of these problems involves the use of redundant data to detect and to correct data. The so-called row and column error correction method uses row and column parity. That is, the bits of the data block are arranged in rows and columns (at least conceptually) and a parity bit for each row and column is recorded with the data block. A parity bit is chosen according to a preset rule to indicate for the bit group involved, such as a row or column, whether the number of binary 1's in the bit group is odd or even. Usually odd parity is used, where the parity bit is set to 1 if the number of "1" data bits in the group involved is even, so that the total number of bits for a group is odd, thus assuring that at least one bit is present in every case.

If parity in a single row and a single column is incorrect when a block is read back from the recording medium one can assume with some degree of assurance that the bit common to both the row and the column with incorrect parity is itself incorrect. The error can be corrected by inverting this common bit. It is usual to break the data into bit row groups of relatively short bytes of say 6 or 8 bits, with a row parity bit recorded for each byte. On the other hand, the column groups of bits may be quite long.

An alternative method for error detection and correction is represented by the family of so-called error correcting codes (ECC) which also involve the creation of a number of redundant bits for each data block. Common generic names for some of these are fire codes and Reed-Solomon codes. These can detect many errors in a block of data, and allow in addition several faulty bits in a block to be corrected. A well-known limitation of such ECC's is that they cannot correct more than a few bit errors in a block, nor can they correct more than one or two widely spaced bit errors. Thus, they are particularly suited for correcting so-called burst errors where the errors are concentrated within a few bits from each other as may occur on magnetic media. Accordingly, it is the practice to use ECC redundancy within such types of data storage unit as disk and tape drives.

The readback electronics are also likely to produce occasional errors, but these are usually either random single bit errors widely spaced from each other, or errors spaced from each other at regular and relatively short intervals. These random errors are usually "soft", i.e. they do not repeat, and hence can be corrected by rereading the data from the storage medium. Post readback byte parity redundancy (hereafter byte parity) may be used to detect these errors. By byte parity is meant the insertion at regular intervals (i.e., with each byte), in the data just after readback, a parity bit which provides parity error detection for the associated byte. Regularly spaced errors are usually indicative of a failure after the serial to parallel conversion during readback. Such errors are not so easily corrected but can at least be detected by byte parity redundancy added to the data after it is read from the medium. It is the usual practice to use EEC redundancy on the storage medium itself and both byte parity and ECC redundancy during readback so as to provide maximum confidence in the integrity of the data manipulations during readback without a great amount of redundant data stored on the recording medium. Further, it is preferred to overlap the two sets of redundant information so that no part of the data pathway is unprotected by error detection/correction.

It is also known to use row and column error correction as described above in magnetic tape data storage systems. If the same bit in a number of rows fail, this method allows reconstruction of the column so affected. This usually is the result of a failure in the head or electronics for the column since a tape medium defect is almost never restricted to a single bit position from row to row.

BRIEF DESCRIPTION OF THE INVENTION

The important insight in the invention to be described is that it is possible to design a typical state-of-the-art data processing installation having multiple data storage units, so that failure of a single storage unit occurs independently of and without affecting the availability of similar units. For example, each may have its own power supply and controller, now technically possible at modest additional cost.

In this invention, a data block is split into a number of data sub-blocks, each of which is encoded for storage in a different data storage unit (DSU) along with its own error detection and correction information. A sub-block consists of a fixed number of bits organized in a sequence allowing each bit to be identified by its position in the sequence. For purposes of implementing this invention, each sub-block bit is associated with the similarly positioned bits in the other sub-blocks to form a bit row. It is desirable (for purposes of maximizing speed of operation) that the storage units be approximately synchronized so that the sub-blocks all are read back within approximately the same interval and at approximately the same bit rate.

The system generates a redundant data sub-block for the data sub-blocks according to a preselected algorithm for which is data reconstruction algorithm exists permitting reconstruction of any one data sub-block using the remaining data sub-blocks and the redundant data sub-block. Preferably, the redundant data sub-block comprises a set of parity bits, one parity bit being associated logically and positionally with each bit row. Another, redundant, data storage unit stores this redundant data sub-block. During writing, it is convenient to generate the redundant data sub-block bit by bit as the bit rows are supplied to the data storage units so as to allow the redundant data block to be stored concurrently with the data blocks. During readback of a particular block, each redundant data block bit can be made available at about the same time its row is.

The odds are extremely remote that two modern data storage units will fail simultaneously. Thus, when a single storage unit fails, the error detection mechanism associated with it generates an error signal. As previously stated, it is extremely unlikely that an error can occur in any column (or sub-block) without being detected by the associated column error detectors. Detection of an error in a sub-block is used to activate data reconstruction means operating on individual rows. Each row having a parity error is corrected by inverting the bit in the column for which the error signal was generated. The system of this invention in its preferred embodiment can correct several types of multiple errors.

By far the most likely multiple error failure mode is for a single sub-block to contain all the errors. The physical basis for this is that a defect in the medium or circuitry of a single data storage unit may well affect more than one bit in a sub-block, or for that matter, many sub-blocks being stored in the same storage unit. As mentioned earlier, since failure of even one of the data storage units is a rare event, the failure of two within a short period of time is extraordinarily rare.

In the preferred embodiment, a byte error detection code is generated for indivdiual bytes encoded in each data sub-block signal provided by a data storage unit. This byte error detection code is generated according to a preselected byte error detection algorithm which includes as a part thereof steps by which certain data errors in each said byte may be detected. Further, the data redundancy means in this embodiment generates according to the preselected algorithm, a sub-block of the type allowing a byte to be corrected in a data sub-block by using the associated bytes in the redundant data sub-block and the other data sub-blocks according to the preselected correction algorithm. Note that this approach allows correction of more than one error occurring in different sub-blocks of the same block so long as more than one of a group of associated sub-block bytes does not have errors.

This apparatus is particularly suitable for implementation as a disk drive data storage system. As mentioned earlier, it is advantageous to increase data transfer rates by simultaneously reading and writing several data storage unit simultaneously. It is relatively easy to design the system so that most disk drive failures are independent, i.e., are unlikely to cause any of the other drives to fail.

Accordingly, one purpose of this invention is to reduce the probability of losing data within a multiple storage unit data storage system to a small fraction of the probability of an individual storage unit failing.

A second purpose is to allow storage units to be simultaneously written and read to increase data rates.

Another purpose is to avoid any interruption in operation of a data processing system caused by failure of a single data storage unit (DSU).

Yet another purpose is to avoid the necessity for and expense of emergency maintenance.

A related purpose is to allow maintenance necessitated by failure of an individual data storage unit to be deferred to a scheduled maintenance time, typically much less expensive.

Another related purpose is to allow a failed DSU to be taken off-line and repaired while the rest of the system functions with the error correction active and so permit uninterrupted system operation during such repair.

Other purposes will become evient from the descriptions which follow.

DESCRIPTION OF A PREFERRED EMBODIMENT

1. General

The preferred system disclosed below has fewer than the number of data storage units one would usually select. However, the number selected (4) accurately illustrates a system operating according to the teachings of this invention and avoids the confusion which adding the likely more preferable 8 or 9 data storage units might create. Note that many different configurations of this invention are possible. The various details of this embodiment are merely illustrative, and are not intended to exclude others. For example, many variations in the logic circuitry are possible to implement the functions described. As the explanation proceeds, possible variations will be mentioned on occasion, however, so as to allow the reader to understand the many specific configurations which the invention may have.

This invention is described with reference first to FIG. 1 which is a block diagram comprised of individual data storage subsystem blocks. It is believed that the function(s) of individual blocks are described with detail more than sufficient to allow someone with skill in the art to easily understand and construct the invention. Many of the individual blocks represent one or more microcircuit elements commonly available today. Other elements, such as data storage units (DSUs) 19a, b, c, d are well-known devices which may be, for example, disk drive units as mentioned previously. Individual blocks are connected by data paths over which individual bits represented by electrical pulses flow. Unless indicated otherwise by a small circle with a number in it (e.g., ref. No. 27) specifying the number of parallel lines represented, it should be assumed that data flow on an individual path is serial, i.e., individual bits are provided sequentially to the destination block or that the path carries a control signal of some type.

It should also be understood that no attempt is made in these FIGS. to show the explicit timing relationships needed to allow the system to function properly. Such timing considerations are well understood in the art and hence need not be discussed in detail. Because of this, it is felt that including detailed timing is as likely to obscure as to clarify the elements and theory of the invention. Furthermore, the written description either explicitly or implicitly establishes all of the timing relationships necessary to understand and implement the invention.

Figure 1:
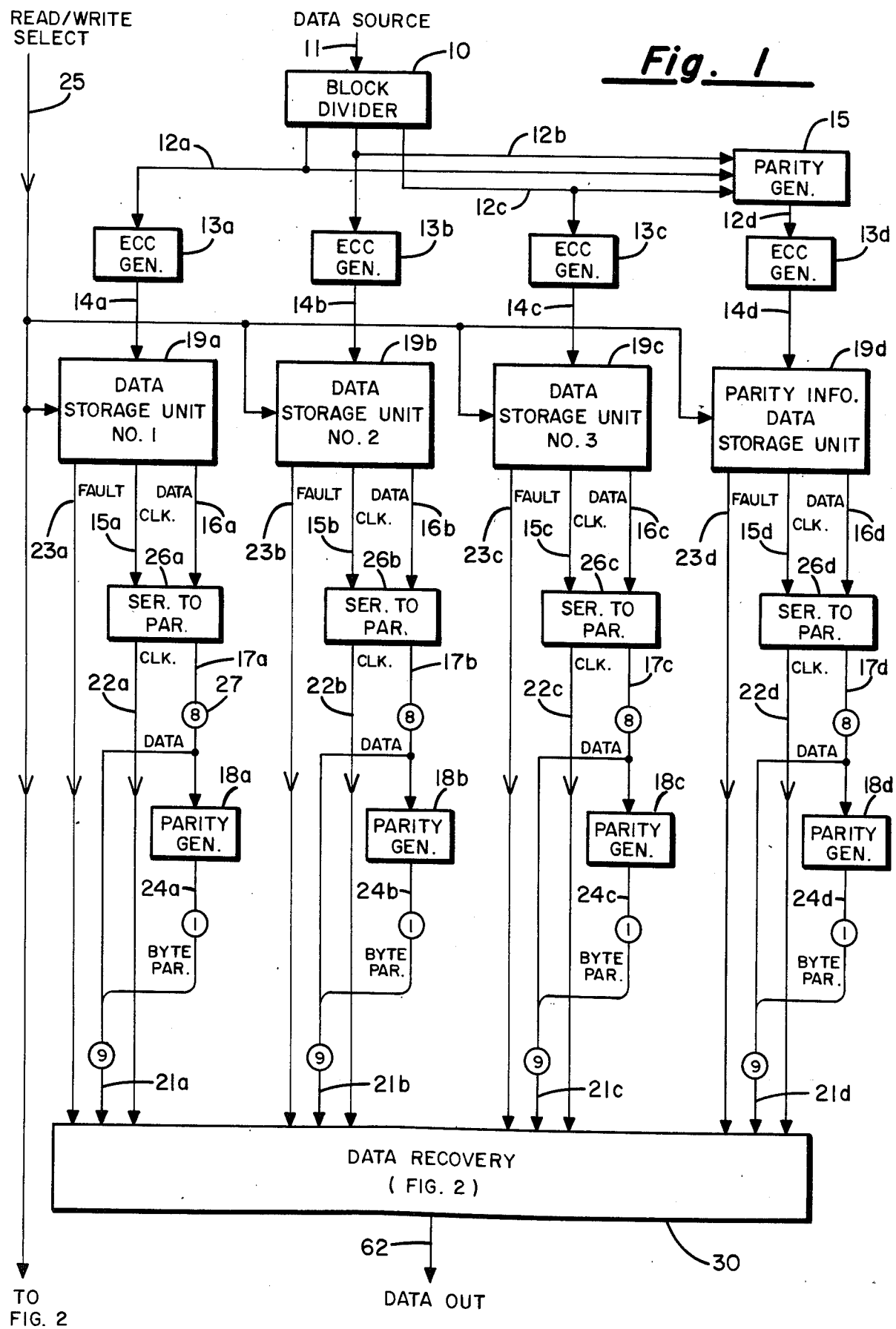
FIG. 1 is a block diagram of a simplified system incorporating the teachings of this invention.
Figure 2:
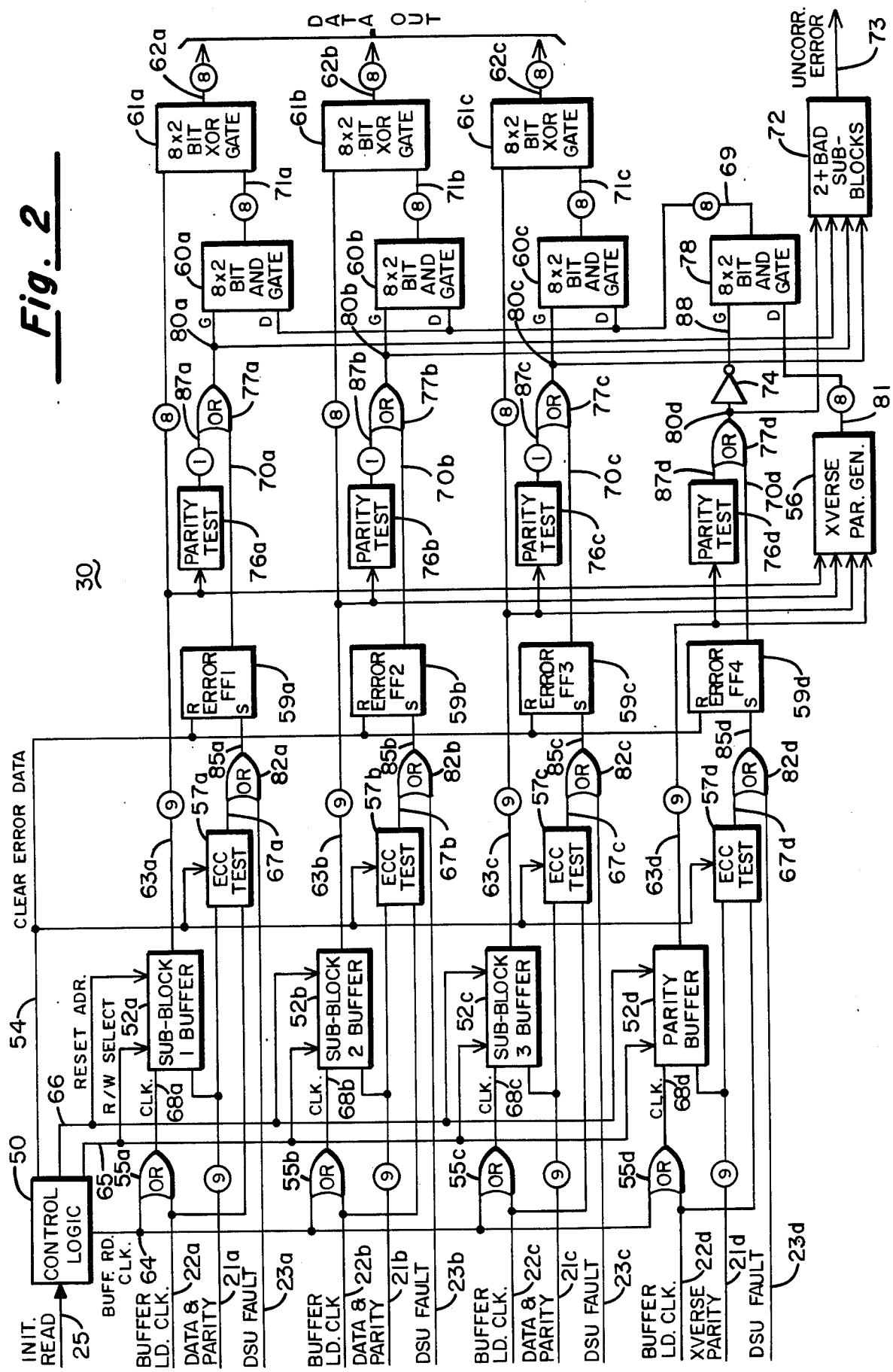
FIG. 2 is a detailed block diagram of the data reconstruction circuitry.

It will be noticed that FIG. 2 contains much more detail than does FIG. 1. This is because FIG. 1 is concerned mostly with the writing of the data in a format permitting its correction by the apparatus shown in FIG. 2. The correction or reconstruction of the data is an inherently more complex problem than mere recording of the original data with the redundancy needed to permit the correction. Thus to adequately disclose the invention it is necessary to describe the readback apparatus in greater detail than the writing apparatus.

2. Writing

Turning first to FIG. 1, data blocks, each comprising a fixed number of bits, can be considered to become available one at a time from an external data source on a data path 11 when the system of FIG. 1 is idle or otherwise able to accept a block. It is convenient to assume that each block has the same number of bits in its, typically in the thousands or tens of thousands of bits. The data on path 11 is received by a block divider 10 which divides the data block into three sub-blocks of equal length which are transmitted on data paths 12a, b, c to ECC generators 13a, b, c respectively. Block divider 10 can be designed to operate in one of two modes, either of which are acceptable. In the first mode, a serial order is established for all the bits in the data block on path 11 and then the first, fourth, seventh, etc. are placed on path 12a; the second, fifth, eighth, etc. on path 12b; and the third, sixth, ninth, etc. on path 12c. Alternatively, block divider 10 can divide each data block into sequential groups of bits, or bytes, placing each first group sequentially on path 12a, each second group on path 12b, and each third group on path 12c.

Further, it is convenient to specify a sequence for the bits comprising each sub-block, and to associate the bits occupying the same position in the sequence in each sub-block. Each such group of bits, each bit in a group being from a different sub-block, will be referred to as a row hereafter, from the analogy to a bit matrix where each sub-block comprises a column. In this embodiment, the bits comprising each row are issued simultaneously by block divider 10. It is immaterial whether bits are provided serially or in parallel on paths 12a, b, c, although the elements receiving signals on these paths must be compatible with the format chosen.

ECC generators 13a, b, c are substantially identical devices which generate error correction and detection data for each data sub-block which is received on their respective input data paths 12a, b, c. The ECC code for each sub-block is generated as the sub-block is received, and the data is passed through the ECC generator involved and encoded in a signal placed on an associated path 14a, b, c. At the end of the data sub-block, the ECC code value has been determined and is encoded and appended to the signal for each data path 14a, b, c. As mentioned earlier, the algorithm used by ECC generators 13a, b, c provides a very high likelihood of detecting any errors in a data sub-block.

Row parity generator 15 also receives the data sub-blocks row by row on paths 12a, b, c from block divider 10. Recall that the data bits forming each row are simultaneously presented in the signals on paths 12a, b, c. Parity generator 15 determines the parity of each row of bits simultaneously presented to it on paths 14a, b, c and a few tens of nanoseconds later provides a signal encoding this parity on path 12d, thereby preserving approximate synchronization between the data on paths 12a, b, c and the associated row parity bits on path 12d. As a practical matter a few tens of nanoseconds are negligible compared to the duration of one bit interval on paths 12a, b, c. ECC generators 13a, b, c, d can all be considered to be similar devices having identical internal speeds. Thus, data storage units (DSUs) 19a, b, c, d in effect simultaneously receive each row and the row parity which has been calculated for it by parity generator 15. If parity generator 15 is so slow that it destroys the synchronism between the bit rows and their individual row parity bits, then it is a simple matter to deal with this problem by, for example, inserting signal delays in paths 14a, b, c.

While each row with its parity need not, in the general case, be presented simultaneously to the DSUs 19a, b, c, d, it is usually preferable to do so, so that each DSU 19a, b, c, d, is active at the same time, increasing the bit storage rate. In systems which use the preferred disks as the media in the storage units, synchronizing the disk rotation results in very large increases in both storage and retrieval speed if the bits of each row are simultaneously presented to their storage units.

At the time the data block to be stored in DSUs 19a, b, c is placed on path 11, a signal is also placed on the read/write control path 25 which specifies that writing or storage of data is desired, and also specifies the physical location on the disks at which the data block is to be stored. The source of this signal may be a CPU (central processing unit, i.e. computer) which uses the system of FIG. 1 as a peripheral device, or it may be a system controller or may have parts supplied by both.

The purpose of the invention is to deal with a failure of one of DSUs 19a, b, c by using the redundancy supplied to the system by DSU 19d to recreate the data. To justify the cost of an additional DSU, the units must be relatively cheap in comparison to the data to be stored. Further, failure of one unit must in most cases be independent of failure of others. That is, the cause of a failure must usually be of the type which causes only a single one of the units to fail, so as to allow the system of this invention to recover or recreate the data. Examples of such kinds of failures are power supply and fuse failures, logic and signal processing failures, head and medium failures in the magnetic tape and disk systems, bad cabling connections, etc.

Examples of non-independent failures which the system of this invention cannot correct are power failures which cause all units to fail simultaneously, or failure of controller hardware common to all the units. But if the failure is one where an individual one of the units fails and the other units continue to perform normally, then this invention can make a useful contribution to overall system reliability.

Therefore, I prefer that each DSU have its own controller so that controller failure is localized in a single storage unit. Such DSUs fail relatively rarely, and failures are for the most part independent of each other.

If DSUs 19a, b, c, d are magnetic or optical disk drives, as is preferred, synchronizing the disk rotation to each DSU allows bit space sequences on one disk medium to be permanently associated with similar sequences on the other DSUs' media, so that associated sequences pass beneath their read/write heads during nearly the same time interval. Such synchronization has the further advantages of allowing simplified readback and true parallel data operation.

The remainder of the description will proceed with the assumption that the preferred disk drive units are employed as DSUs 19a, b, c, d. DSUs 19a, b, c, d all receive and store each set of three row bits and their associated parity bit very nearly simultaneously. As successive sets of rows and the associated parity bits are presented to DSUs 19a, b, c, d, these too are stored so that at the end of the sub-blocks, the bits are arranged on the disks within the DSUs 19a, b, c, d in serial fashion. The individual sub-blocks are followed by the aforementioned ECC information which is also stored serially on the DSU's disks. Thus, when writing of a block has been completed, each sub-block has been serially stored with its ECC information data appended. Further, because of the synchronization of the individual DSUs' spindles, when the read/write heads are positioned in the tracks storing the sub-blocks involved, the bits of each individual row will appear beneath the respective read/write heads at very close to the same instant.

It is usually the case that a particular data block is to be stored at a predetermined physical location on the disks of DSUs 19a, b, c, d. Thus, the data block must be presented to block divider 10 at a time synchronized with the angular position of the spindles which carry the disk media within DSUs 19a, b, c, d. Typically, the data source is itself signalled to begin transmitting the data block to be stored when the read/write heads have been properly positioned in the desired data tracks and the disks' angular positions are such that the writing signals appear on the read/write heads as the desired physical lengths of the tracks are passing beneath the heads. Such synchronization and coordination between the transmission of data from the source and the disk(s) on which it is to be stored is well known.

3. Reading

During reading, control signals encoding the location of the desired data block issued to the individual DSUs 19a, b, c, d on path 25 cause the read/write heads to be positioned on the tracks containing the sub-blocks of the desired data block. Further, the read/write signal on path 25 specifies the desired function as reading. As the individual bit spaces move past the read/write heads, each of the DSUs 19a, b, c, d encode in a raw data signal carried on paths 16a, b, c, d respectively, the bits of the sub-block stored in the track spaces specified by the read/write signal. Bits in the raw data signals are accompanied by clock (CLK) signals on paths 15a, b, c, d, as provided by the DSU 19a, b, c, d involved. A set of serial to parallel circuits 26a, b, c, d receives the raw data and clock signals from their respective DSUs 19a, b, c, d and assembles each successive set of 8 bits into 8 bit parallel byte signals on paths 17a, b, c, d followed a very short fixed interval later by a byte clock signal on the associated path 22a, b, c, d.

Byte parity generators 18a, b, c, d receive the 8 bit bytes on paths 17a, b, c, d respectively and generate an odd byte parity bit for the byte received, encoding this parity bit in the signals on paths 24a, b, c, d respectively. Byte parity generators 18a, b, c, d are of the type with such great internal speed relative to the time that a particular 8 bit byte signal is available on paths 17a, b, c, d that each 8 bit byte signal and its associated byte parity bit can be treated as a single 9 bit byte. This is symbolized by the combining of the parity signals on paths 24a, b, c, d with their related byte signals on paths 17a, b, c, d to form 9 bit byte signals as encoded on paths 21a, b, c, d. Thus, the clock signal on the respective clock signal path 22a, b, c, d identifies the times at which individual data and row parity bits are present on paths 21a, b, c, d respectively. If errors occur in the data during later processing, testing this row parity is very likely to reveal such errors, and the capability of the error correction system to be described allow errors in different sub-blocks to be corrected in many cases.

A data recovery system 30 receives these data and row parity signals and provides an output signal on path 62 encoding the data block originally supplied on path 11, correcting those errors which are correctable. Internal faults sensed by DSUs 19a, b, c, d are indicated to data recovery system 30 on their respective fault signal paths 23a, b, c, d. In many cases, this system can also recover from complete loss of data on one DSU 19a, b, c, d, as indicated by a fault signal on a path 23a, b, c, d.

4. Error Recovery

FIG. 2 discloses the details of system 30 which allows the reconstruction of an entire data block stored on DSUs 19a, b, c in spite of the presence of one or more otherwise uncorrectable errors in, or even the unavailability of, a constituent sub-block stored on any one of the DSUs 19a, b, c. The earlier-mentioned read command on path 25 also signals a control logic element 50 to begin a read sequence, the steps of which will be described in conjunction with the description of the various elements shown in FIG. 2.

The major elements at the input side of the readback circuitry are sub-block buffers 52a, b, c, d, which store each entire sub-block as they are received on paths 21a, b, c, d from DSUs 19a, b, c, d respectively. Sub-block buffers 52a, b, c, d are similar devices from which the data sub-blocks are read and corrected if necessary. The byte parity, DSU fault signals, and the appended ECC information may all be used to determine need for corrections. Their use will be explained using buffer 52a as an example. Buffer 52a has an internal pointer register for addressing its bit locations. This internal register is initially cleared by a RESET ADR (ADdRess) signal on path 66 generated in response to a read command on path 25. The internal pointer register is incremented by one by each clock (CLK) signal pulse on path 68a. When the read/write select (R/W SEL) signal on path 65 is set to a logical 1, it places buffer 52a in write mode and individual 9 bit bytes can be loaded into buffer 52a via data path 21a and stored or written in the location in buffer 52a specified by its pointer register. Successive clock pulses on path 68a cause this pointer register to cycle through the internal memory of buffer 52a and load successive bytes presented on path 21a into the buffer locations specified by the internal pointer register.

When path 65 carries a logical 0, buffer 52a is set to read mode and places on data path 63a a signal encoding the contents of the byte location addressed by the pointer register. As the pointer register content is incremented by pulses on path 68a, path 63a successively carries signals encoding each byte stored in buffer 52a. Further, when buffer 52a first enters read mode from write mode, the correction part of the ECC algorithm by which the ECC information appended to the data on path 21a is developed, is implemented within buffer 52a to correct the data in buffer 52a if necessary and possible. Similar activity is associated with each of sub-block buffers 52b, c, d.

ECC test element 57a is very closely related to sub-block buffer 52a, and receives the data and byte parity signals on path 21a to perform the complementary function of detecting errors in the data. Errors detectable but uncorrectable by the ECC algorithm are independently signalled by ECC test element 57a with a logical 1 on path 67a. A logical 0 indicates either a sub-block which had no errors in it or one in which errors had been corrected within buffer 52a. Test elements 57b, c, d are similarly related to buffers 52b, c, d and perform the same functions, providing a logical 1 signal on paths 67b, c, d when detectable but uncorrectable errors are present in the sub-block just received, and a logical 0 otherwise. It is necessary to reset each test element 57a, b, c, d before receipt of each sub-block.

A read operation requested by a signal on path 25 prompts control logic device 50 to execute a signal sequence for first loading the individual sub-blocks from DSUs 19a, b, c, d into buffers 52a, b, c, d and then eventually placing the sub-block bytes sequentially on paths 62a, b, c, corrected as necessary and possible. Initially, control logic device 50 places a reset signal on path 66 which sets the internal pointer registers in sub-block buffers 52a, b, c, d to the address of the first byte's location in each. It can be assumed that shortly therafter DSUs 19a, b, c, d (FIG. 1) start transmitting bits serially on paths 16a, b, c, d which are assembled into bytes and encoded in the signals on paths 21a, b, c, d, each byte being followed shortly by a load clock (LD CLK) signal on paths 22a, b, c, d, all respectively.

Each LD CLK signal on the paths 22a, b, c, d is applied to one input of an OR gate 55a, b, c, d respectively which in response produces the clock pulses on paths 68a, b, c, d needed to increment the pointer registers in buffers 52a, b, c, d. Since the timing of the LD CLK signals is ultimately controlled by the DSUs 19a, b, c, d individually, each buffer 52a, b, c, d can be filled at the speed of its associated DSU 19a, b, c, d.

As each data or row parity sub-block byte on data paths 21a, b, c, d is received by buffers 52a, b, c, d, the byte is also transmitted to the respective ECC test element 57a, b, c, d. Before the start of transmission from DSUs 19a, b, c, d, ECC test elements 57a, b, c, d receive on path 54 the clear error data signal from control logic device 50 which signal is used to initialize each element. Each test element 57a, b, c, d has an internal accumulator which contains during transmission of data bytes to it, the current results of the error detection algorithm employed by the elements 57a, b, c, d, and this is initially set to 0 in each by the clear error data signal on path 54. Elements 57a, b, c, d also typically contain an internal counter, each of which is set to the number of bytes in a data sub-block by the signal on path 54.

Each signal pulse on path 22a, b, c, d causes its associated ECC test element's counter to decrement by 1. When the counter has been decremented the number of times equalling the number of bytes in a sub-block, the error test element 57a, b, c, d then uses the remaining bytes received as the error detection code and compares it to the contents of the associated internal accumulator to determine whether detectable but not correctable errors are present in the data transmitted on the associated path 21a, b, c, d. If no such errors are present in this data (or in the row parity information on path 21d) a logical 0 is placed on the associated output path 67a, b, c, d. If an error is detected in this procedure, a logical 1 is placed on the path 67a, b, c, d associated with the erroneous data or row parity.

As previously mentioned, there are several errors which can be sensed internally by the DSUs 19a, b, c, d, and whose occurrence is signalled on the associated fault signal line 23a, b, c, d. The ECC test errors signalled on paths 67a, b, c, d are provided with the DSU fault signals on paths 23a, b, c, d to the inputs of OR gates 82a, b, c, d respectively. OR gates 82a, b, c, d thus provide an output signal which is a logical 1 when an error has been detected by either the associated DSU 19a, b, c, d or the associated ECC test element 57a, b, c, d. The OR gate 82a, b, c, d, outputs form the inputs to the set (S) inputs of flip-flops 59a, b, c, d respectively on paths 85a, b, c, d.

At the start of each read operation flip-flops 59a, b, c, d receive on their reset (R) inputs the clear error data signal provided on path 54. This signal sets the initial state of the flip-flops 59a, b, c, d to their cleared condition, where the logic levels of their outputs are 0. In response to a logical 1 on any of paths 85a, b, c, d, the associated flip-flop 59a, b, c, d output on path 70a, b, c, d is set to a logical 1. Thus, after each group of sub-blocks comprising a data block have been loaded into buffers 52a, b, c, d, the outputs of flip-flops 59a, b, c, d indicate by a 0 or a 1 at their outputs whether the data sub-block in the associated buffer 52a, b, c, d is respectively correct or in error. It should be noted that the logic circuitry handling the row parity sub-block stored in the row parity buffer 52d has some similarity to the logic circuitry for handling the data sub-blocks.

When the data sub-blocks and the row parity sub-block have been loaded into the sub-block buffers 52a, b, c, and 52d respectively, and the error flip-flops 59a, b, c, d have been set to indicate whether a sub-block contains an error or not as just explained, then the remainder of the read process, including error correction if necessary, can proceed. The control logic device 50 resets the pointers in sub-block buffers 52a, b, c, d to the start of the sub-blocks again within these buffers. Control logic device 50 also sets the output on the R/W SEL path 65 to a logical 0, conditioning buffers 52a, b, c, d to output the data stored in them on paths 63a, b, c, d. Control logic device 50 then issues read clock (RD CLK) pulses at a preset rate on path 64 in a number equal to the number of bytes stored in a sub-block. These are received by a second input terminal of OR gates 55a, b, c, d. Each of these pulses cause the OR gates 55a, b, c, d to transmit a pulse on paths 68a, b, c, d respectively, causing buffers 52a, b, c, d to transmit one sub-block byte stored within each of them on paths 63a, b, c, d. Each set of data bytes from buffers 52a, b, c, and the row parity byte from buffer 52d which issue in response to the same read clock pulse on path 64 contains associated information for purposes of correcting a portion of the data according to this invention. It should be noted that buffers 52a, b, c, d may be of the type which can be written into and read from simultaneously, in which case the buffers 52a, b, c, d may be loaded by the next block to be read from DSUs 19a, b, c, d while the current block is undergoing any correction needed and transmission from the buffers.

Transverse parity generator 56 simultaneously receives the data and parity bytes which have been read from buffers 52a, b, c, d by the same read clock pulse on path 64, and in response to this data generates, properly ordered, the eight bits of the bit by bit odd parity of each set of four associated bits provided on paths 63a, b, c, d. That is, the bits from each of the bytes on paths 63a, b, c, d which occupy the same position in their respective bytes are used to generate the bit in the parity byte on path 81 occupying the corresponding location. Odd parity is generated in each position so that if the bits involved are all correct, then the corresponding output parity bit on path 81 is a logical 0. If the parity of the four input bits is *even*, i.e., has one incorrect bit in it, then generating odd parity provides a logical 1 on path 81 in the corresponding bit position.

8×2 bit AND gate array 78 receives the 8 bits carried in parallel on path 81, properly ordered, at its 8 data (D) inputs and the output of inverter (I) element 74 on path 88 at each of its 8 gate (G) inputs. If the signal on path 88 at the gate input is a logical 0, each bit of the 8 outputs on path 69 from AND gate 78 is also a logical 0. If the signal on path 88 is a logical 1, the 8 data bits provided on path 81 to the 8 data inputs of AND gate array 78 are gated to the outputs on path 69 making its signal identical to the signal on path 81. It will be explained later how the gate input on path 88 is set to a logical 1 if the parity information byte currently being processed appears to be correct.

Turning next to the byte parity test elements 76a, b, c, d, each of these sequentially receive the bytes placed on paths 63a, b, c, d by the respective sub-block buffers 52a, b, c, d. The parity of each such byte is tested by the byte parity test element 76a, b, c, d receiving it, and if correct, a logical 0 is provided on the associated path 87a, b, c, d to the OR gate 77a, b, c, d receiving the path's signal as an input. If parity is tested to be incorrect, then a logical 1 is provided on path 87a, b, c, d respectively to the OR gate 77a, b, c, d involved. As described above, each OR gate 77a, b, c, d receives as its other input the output of the associated error flip-flop 59a, b, c, d.

The outputs of OR gates 77a, b, c are provided on paths 80a, b, c respectively to the 8 gate (G) inputs of each of the 8×2 bit AND gate arrays 60a, b, c. 8×2 bit AND gate arrays 60a, b, c are identical in construction to that of 8×2 bit AND gate array 78 and of course operate in the same way. 8×2 bit AND gate arrays 60a, b, c receive at their 8 data (D) inputs the properly ordered 8 bit output of 8×2 bit AND gate array 78 on path 69. The 8 bit outputs of the AND gate arrays 60a, b, c on paths 71a, b, c respectively thus duplicate the 8 bits on path 69 if and only if the sub-block associated with the 8×2 bit AND gate array 60a, b, c involved has an error in it as indicated by a logical 1 carried on the respective input path 80a, b, c.

OR gate 77d receives the output of flip-flop 59d on path 70d and of parity test element 76d on path 87d at its two inputs. If either or both of these inputs is a logical 1, i.e. an error has been sensed as indicated by flip-flop 59d or detected by byte parity test element 76d, then OR gate 77d produces a logical 1 encoded in the signal at its output, path 80d. The output of OR gate 77d is inverted by inverter 74 and provided to the gate input of 8×2 bit AND gate array 78 on path 88. Thus, if the parity information byte on path 81 has passed all of its error tests, a logical 1 is placed on path 88 and the parity information byte is gated by 8×2 bit AND gate array 78 to path 69.

8×2 bit exclusive OR (XOR) gate arrays 61a, b, c each receive two properly ordered 8 bit parallel inputs on their two inputs and provide the bit by bit exclusive OR of these two inputs as their outputs. As is well known, an exclusive OR element generates a logical 0 value if the two input arguments or signals are equal to each other, and a logical 1 value if the two arguments are unequal. Thus for each bit which is a binary or logical 1 in any of the 8 bit parallel paths 71a, b, c, 8×2 bit XOR gate arrays 61a, b, c provide the inversion of the corresponding bit of the data sub-block bytes carried on paths 63a, b, c as the output in the corresponding bit positions of 8 bit parallel data paths 62a, b, c. All of the bit values on paths 63a, b, c for which the corresponding bit values on paths 71a, b, c are a logical or binary 0, are provided unchanged in the corresponding bit position of the data paths 62a, b, c. To reiterate, it is, of course, essential that proper order of bit positions in path 63a with path 71a, path 63b with path 71b, etc. be maintained.

Thus, if a row parity error is present in a set of bits occupying the same relative position in buffers 52a, b, c, d and one of the drives (via fault signals on paths 23a, b, c, d), byte parity tests (via parity test elements 76a, b, c), or ECC tests (elements 57a, b, c) identifies the buffer in which the erroneous bit is located, the bit is inverted by the 8×2 bit XOR gate 61a, b, c receiving it on the respective path 63a, b, c. This corrects that bit in that its changed value causes its associated bits in the remaining two of the three buffers 52a, b, c and row parity buffer 52d to agree paritywise.

An example is helpful here. Assume that during readback of a data block from DSUs 19a, b, c, d an error is detected in sub-block 2 by sub-block 2 ECC test element 57b. This causes error flip-flop 2 (FF2) 59b to set set, with a logical 1 present on its output path 70b. At some time while individual 8 bit bytes are issuing on paths 63a, b, c, d further assume that transverse parity generator 56 provides an output on path 81 in which a single bit is set to a logical 1. Let us assume that the data bit corresponding to this logical 1 on path 81 and carried on path 63b is also a logical 1. If a logical 0 is present on path 80d indicating that according to conditions controlling its value the row parity sub-block in the row parity buffer 52d is correct, then the parity byte on path 81, including at least one logical 1 bit generated by parity generator 56 and identifying the location of the bit in error on path 63b, is gated to path 69. This 8 bit byte is further gated by the logical 1 generated on path 80b by OR gate 77b to path 71b. The bit on path 63b having the same bit position as the logical 1 on path 71b from 8×2 bit AND gate 60b is inverted by the 8×2 bit XOR gate 61b and issues as a logical 0 on path 62b because both inputs at that bit position have the same value, in this case 1. The logical 0 on path 62b at the position of interest here is the inverse of the logical 1 on path 63b which was read from DSU 19b. In all likelihood, this bit (and perhaps others as well in this sub-block stored in buffer 52b) is incorrect, and by inverting this bit from buffer 52b, the correct value for the bit is encoded in the signal on path 62b. Note that inverting a single bit in any group of four for which parity is calculated by transverse parity generator 56 changes the parity of that group, on effect correcting it.

The unlikely event of two or more data and row parity sub-blocks of a block being in error is dealt with by supplying the outputs from OR gates 77a, b, c, d to "2+ bad sub-blocks" element 72. If two or more logical 1's are presented on path 80a, b, c, d to element 72, this indicates that two or more of the sub-blocks of a block have errors in them. In response to this condition, element 72 provides a signal on path 73 which indicates to the CPU or other external device that uncorrectable errors are present in the block.

Note that for byte parity errors detected by parity test elements 76a, b, c, d, it is possible that for successive bytes, different data sub-blocks may contain the error(s), and yet be correctable. This is because the byte parity generated by the byte parity generators 18a, b, c, d shown in FIG. 1 is localized to the single byte involved, and hence need not affect the correction of similar errors occurring in non-associated bytes in other sub-blocks. Note also that if a DSU or ECC fault is detected for a particular sub-block as indicated by the appropriate error flip-flop 59a, b, c, d, a byte parity error in a different sub-block can no longer be corrected. This condition is flagged by test element 72.

It is well known that the function of logic circuitry such as that described above can be duplicated by many different logic structures. For example, selection of logical 0 and 1 values is somewhat arbitrary in that these terms really represent only voltage levels and individual circuit responses to these voltages. These conventions and others as well are well known to those having familiarity with logic design, and no particular note need be taken of such.

As was previously mentioned, it is also important to realize that use of three only DSUs 19a, b, c to store data is probably not the number that a typical commercial system would have, since the reliability of these units justifies in most cases that eight or more be united in a single system. The configuration of sub-block buffers 57a, b, c, d in storing 8 bit parallel bytes is arbitrary as well. In such a complex electronic system as is described above, it is to be expected that many alternatives are possible in employing the inventive concepts to provide a device having similar capabilities. Thus, I respectfully request that the claims here following be given an interpretation which covers mere imitations of the system described above and differ therefrom in insubstantial ways while using my inventive concepts.

What I claim is:

1. A data storage system for storing a data block supplied to the system encoded in a set of at least three individual data sub-block signals, each of said data sub-block signals encoding one of a number of sub-blocks into which the data block is broken, the number of sub-blocks equaling the number of data sub-block signals, and the system comprising:
  (a) a plurality of similar data storage units in number equal to the number of data sub-block signals and another, redundant, data storage unit, each capable of storing a plurality of sub-blocks within itself responsive to a write select signal and encoding them in an output data sub-block signal responsive to a read select signal specifying the sub-block desired, each of the data sub-block signals being received by a preselected one of the data storage units, and each data storage unit being substantially physically independent from the others and liable to independent failure to supply output data sub-block signals correctly encoding the sub-blocks stored therein;
  (b) data redundancy means receiving the set of data sub-block signals for generating according to a preselected algorithm a redundant data sub-block, said redundant data sub-block being of the type for which a data reconstruction algorithm exists permitting reconstruction of any one data sub-block using the remaining data sub-blocks and the redundant data sub-block, and for providing to the redundant data storage unit a signal encoding the redundant data sub-block;
  (c) a plurality of data storage unit error detection means, each operatively associated with a preselected data storage unit, for providing a sub-block error signal responsive to failure of the associated data storage unit to correctly encode in an output data sub-block signal a sub-block stored within it;
  (d) control means for supplying the write and read select signals to the data and redundant data storage units in a preselected sequence; and
  (e) data reconstruction means receiving the sub-block error signals from the error detection means and the data and redundant data sub-block signals from the data storage units, for employing the data reconstruction algorithm to recreate and encode in the output data signal, the data sub-block originally stored within the data storage unit for which the sub-block error signal was generated.

2. The system of claim 1, further comprising:
  (a) byte error code generating means receiving a data sub-block signal from a data storage unit, for providing to the error detection means a signal encoding a byte error detection code associated with at last one byte within the sub-block, said byte error detection code generated according to a preselected byte error detection algorithm which includes as a part thereof steps by which certain data errors in each said byte may be detected; and
  (b) byte error detection means receiving each byte error detection code signal and a signal encoding the byte for which it was generated, for applying the error detection algorithm to each said byte and its associated byte detection code and response to detection of an error in said byte, issuing a byte error signal associated with the byte having the error and its sub-block;
  wherein the data redundancy means further includes means for generating according to the preselected algorithm a redundant data sub-block whose data reconstruction algorithm permits reconstruction of a byte within a data sub-block using an associated byte in the redundant sub-block and an associated byte from each of the other data sub-blocks; and
  wherein the data reconstruction means further includes means receiving the byte error signal, for employing the data reconstruction algorithm to recreate and encode in the output data signal the data sub-block byte originally stored within the data storage unit.

3. The system of claim 2, wherein the byte error detection means receives signals encoding bytes from at least two different sub-blocks of the same data block and supplies byte error detection code signals for each, and wherein the data reconstruction means includes means receiving the byte error detection code signals, for supplying an uncorrectable error signal responsive to detecting errors in at least two bytes occupying the same relative position in two different sub-blocks.

4. The system of claim 2, wherein the byte error code generating means includes means for generating a parity bit signal for the byte.

5. The system of claim 1, wherein the data reconstruction means further includes means for receiving the sub-block error signals, and responding to errors in at least two sub-blocks of the same data block, supplies an uncorrectable error signal.

6. The apparatus of claim 1 wherein the data redundancy means includes means for generating for a set of associated bits, one from each data sub-block, a signal encoding the parity of said set of bits.

* * * * *